United States Patent [19]

Schmidt et al.

[11] 4,327,004

[45] * Apr. 27, 1982

[54] AQUEOUS DISPERSIONS OF PLASTICS IN WHICH THE AVERAGE DIAMETER OF THE DISPERSION PARTICLES IS IN THE RANGE FROM ABOUT 50 TO 500 NM, AND A PROCESS FOR THEIR PREPARATION

[75] Inventors: Adolf Schmidt, Cologne; August Böckmann, Krefeld, both of Fed. Rep. of Germany

[73] Assignee: Bayer Aktiengesellschaft, Leverkusen, Fed. Rep. of Germany

[ * ] Notice: The portion of the term of this patent subsequent to Apr. 27, 1999, has been disclaimed.

[21] Appl. No.: 173,568

[22] Filed: Jul. 30, 1980

[30] Foreign Application Priority Data

Apr. 2, 1980 [DE] Fed. Rep. of Germany ....... 3012821

[51] Int. Cl.$^3$ ............................................. C08L 27/06
[52] U.S. Cl. .................................. 524/745; 526/225; 524/832; 524/819; 524/831

[58] Field of Search .................. 260/29.6 R, 29.6 XA, 260/29.6 T, 29.6 TA, 29.6 H, 29.6 SQ, 29.7 R, 29.7 H, 29.7 T, 29.7 SQ, 29.6 Z, 29. MQ; 526/225, 911, 344.2

[56] References Cited

U.S. PATENT DOCUMENTS

| | | | |
|---|---|---|---|
| 2,771,457 | 11/1956 | Barnes et al. ...................... | 526/911 |
| 2,829,134 | 4/1958 | De Coene ........................... | 526/911 |
| 3,037,007 | 5/1962 | Scholz et al. ..................... | 526/344.2 |
| 3,179,613 | 4/1965 | Guenther et al. .................. | 526/911 |
| 3,296,170 | 1/1967 | Burkhart et al. .................. | 526/911 |
| 3,546,154 | 12/1970 | Hwa et al. ........................ | 526/911 |
| 4,218,553 | 8/1980 | Winter et al. ..................... | 526/225 |

*Primary Examiner*—Paul R. Michl
*Attorney, Agent, or Firm*—Sprung, Felfe, Horn, Lynch & Kramer

[57] ABSTRACT

An aqueous dispersion of a synthetic polymer of average diameter in the range of 50 to 500 nm and especially above 75 nm is disclosed, the aqueous dispersion having a solids content of 5 to 50 parts by weight per 100 parts per weight of total dispersion. The aqueous dispersion is provided by effecting polymerization in the presence of an emulsifier which comprises an alkali metal salt of a polysulfonic acid of an alkane of medium chain length e.g. 8 to 22 carbon atoms.

14 Claims, No Drawings

AQUEOUS DISPERSIONS OF PLASTICS IN WHICH THE AVERAGE DIAMETER OF THE DISPERSION PARTICLES IS IN THE RANGE FROM ABOUT 50 TO 500 NM, AND A PROCESS FOR THEIR PREPARATION

The invention relates to aqueous dispersions of plastics in which the average diameter of the dispersion particles is in the range from about 50 to 500 nm, and to a process for establishing the average particle diameter.

It is known to establish the average particle diameter of dispersion particles in a controlled manner by the so-called "seeding latex process" (Houben-Weyl, Volume XIV/1 (1961), pages 339 to 342 and pages 878 to 880). In the seeding latex process, a certain amount of a latex is initially introduced as seeds and the dispersion is then prepared, starting from these seeds, by polymerization of a monomer. According to a correlation known from Houben-Weyl, Volume XIV/1 (1961), on page 340, providing that no new latex particles are formed as seeds during the polymerization and that the density of the polymer remains constant during the polymerization, the average diameter of the latex particles thus obtained depends on the average diameter of the particles in the seeding latex and on the cube root of the quotient of the amount of polymer after the polymerization and the amount of polymer in the seeding latex. If the average diameter of the latex particles is to be substantially increased by this process, the amount of polymer in the seeding latex must therefore be kept as small as possible. Under these conditions, the polymerization, especially emulsion polymerization, proceeds very slowly and it is very difficult to meter in a further quantity of the emulsifier such that on the one hand no new particles are formed and on the other hand no coagulation occurs.

According to a correlation known from J. Chem. Physics 16, 592 (1948), the number of latex particles in a dispersion is proportional to the concentration of the initiator and of the emulsifier which are added, in a manner which is in itself customary, in the polymerization. A reduction in the number of particles, which is necessary for the seeding latex process, can thus only be achieved by reducing the concentration of the emulsifier and/or of the initiator. However, this is possible only to a very limited extent, since when the emulsifier concentration is greatly reduced in a polymerization, coagulation as a rule occurs, and the initiator concentration cannot be reduced at will, in the interests of as quantitative as possible a polymer yield (low yields, polymerization does not start).

Attempts have also been made (Houben-Weyl, Volume XIV/1, page 336 (1961)) to influence the size of the latex particles in the dispersion of the plastic by the choice of emulsifier. Thus, for example, the use of non-ionic emulsifiers to prepare coarse-particled dispersions is proposed. However, these emulsifiers retard the polymerization and impart to the dispersions a stability to electrolytes and freezing, which is frequently undesired.

It is furthermore known that certain emulsifiers which belong to the surface-active class of carboxylates give larger latex particles than, for example, alkylsulphonates or alkyl-sulphates with carbon chain lengths of 10 to 18 carbon atoms (literature: Houben-Weyl, Volume XIV/1, page 336 and page 203 (1961)).

Carboxylate emulsifiers are, however, effective only in an alkaline reaction medium. In many cases, however, industrially important monomers cannot be polymerized in an alkaline medium without disadvantages (literature: Houben-Weyl, Volume XIV 1, pages 167–170 and 985 to 989 (1961)).

Alkylsulphonates are known as emulsifiers which can be employed in an acid reaction medium and in an alkaline reaction medium. Thus, for example, alkali metal alkanesulphonates with a high content of monosulphonate are employed, by themselves or in combination with other emulsifiers, in the emulsion polymerization of monomers such as, for example, vinyl chloride and vinyl chloride comonomer mixture (DE-OS No. (German Published Specification) 2,429,326).

It is known, from DE-OS (German Published Specification) No. 2,429,326, to use alkali metal alkanesulphonate together with an alkali metal arylsulphonate as an emulsifier in the polymerization of vinyl chloride. The alkane radicals of the alkali metal alkanesulphonates have a chain length of 10 to 18 carbon atoms.

The use of the sodium salts of an isomer mixture of alkyl-disulphonic acid diaryl esters containing sulphone groups as an emulsifier in the preparation of polyvinyl chloride is described in DE-OS (German Published Specification) 2,633,835. It is also known to employ alkali metal sulphonates with a high monosulphonate content, by themselves or in combination with other emulsifiers, in the emulsion polymerization of vinyl chloride and of vinyl chloride and comonomers (DE-OS (German Published Specification) 2,429,326).

At the same time, however, it is known that anionic emulsifying agents, such as alkyl-sulphates, alkylsulphonates and alkylaryl- and arylalkyl-sulphonates, are already adequate at a low concentration as particularly effective primary emulsifying agents for the preparation of very fine-particled dispersions (Dispersionen synthetischer Hochpolymerer (Dispersions of Synthetic High Polymers), Section I (Eigenschaften, Herstellung, Prüfung) (Properties, Preparation, Testing), Springer Verlag Vienna, Heidelberg, New York, page 64 (1969)).

According to the invention, aqueous stable dispersions of plastics in which the dispersion particles have an average diameter in the range from about 50 to 500 nm and which have a solids content of 5 to 50 parts by weight, per 100 parts by weight of the total dispersion, have been found, which are characterized in that they are prepared in the presence of an emulsifier system which contains 15 to 100 parts by weight, preferably 25 to 85 parts by weight, per 100 parts by weight of the total emulsifier, of an alkali metal salt of polysulphonic acids of alkanes of medium chain length. Preferably, the particles have an average latex diameter above 95 nm, more preferably above 150 nm and especially 175 to 500 nm. The invention provide particles in the range of 150 to 530 nm, average latex particle diameter.

According to the invention, polysulphonic acids of an alkane of medium chain length contain 2 or more sulphonic acid groups. Mixtures of polysulphonic acids of varying degree of sulphonation and essentially with 2 and 3 sulphonic acid groups are preferably employed. The degree of sulphonation is in general in the range from 2 to 4, preferably from 2 to 3.

Alkanes of medium chain length are saturated, straight-chain or branched hydrocarbons, preferably straight-chain hydrocarbons, with about 8 to 22 carbon atoms. Polysulphonic acids of alkanes with an average carbon number of 13 to 17 carbon atoms can preferably be used.

Polysulphonic acids of alkanes of different chain lengths are in general employed.

Alkali metal salts which may be mentioned are essentially the sodium and potassium salts.

The preparation of the alkali metal salts of the alkanesulphonic acids is in itself known. For example, they can be prepared by sulphochlorination of the alkanes and subsequent saponification of the products with an alkali metal hydroxide (Chemie und Technologie der Paraffin-Kohlenwasserstoffe (Chemistry and Technology of the Paraffin Hydrocarbons), Akadamie-Verlag, Berlin, 1956, pages 395 to 474).

Emulsifiers which are to be employed according to the invention and which have a high content of polysulphonic acids or alkali metal salts thereof are obtained, for example, when the alkanes are sulphochlorinated to as high a degree as possible and the products are then saponified. If necessary, monosulphonic acid contents which are still present can be separated off. The separation can be effected, for example, by extraction with diethyl ether.

The emulsifier employed in the polymerisation can contain, in addition to the content, according to the invention, of polysulphonates of an alkane of medium chain length, other emulsifiers which are in themselves customary for the polymerisation of monomers. The following customary emulsifiers may be mentioned as examples: monosulphonates of alkanes of medium chain length with a terminal sulphonate group, such as are obtained, for example, by reaction of alkyl-sulphates with sodium sulphite or by addition of sodium bisulphite or ammonium bisulphite onto olefines, or with a sulphonate group which is bonded to a secondary carbon atom of an alkane, such as can be prepared, for example, by saponification of the corresponding paraffin sulphonyl chlorides.

An emulsifier system according to the invention can be particularly advantageously prepared when an alkane is sulphochlorinated in a manner which is in itself known such that mono- and poly-sulphochlorinated alkanes are formed, which are then hydrolysed. The proportion of polysulphonates in the emulsifier system can be established by changing the degree of sulphochlorination. A change in the degree of sulphochlorination is in general achieved by changing the stoichiometric proportions of the starting compounds.

Other customary emulsifiers which can be combined, for example, with the emulsifier according to the invention are, for example, alkylbenzenesulphonates with straight-chain alkyl radicals with 12 to 14 carbon atoms, sulphosuccinic acid esters, such as, for example, sodium dioctyl-sulphosuccinate, fatty alcohol sulphonates, such as sodium lauryl-sulphate, mixtures of fatty alcohol sulphates with 10 to 18 carbon atoms, sulphates of substituted polyglycol ethers of fatty alcohols with 10 to 20 carbon atoms which are reacted with 3 to 20 mols of ethylene oxide and subsequently sulphated, or of alkylphenols, such as, for example, p-nonylphenols, which are reacted with 3 to 30 mols of ethylene oxide and subsequently sulphated (that is to say esterified with sulphuric acid). "Grenzflächenaktive Substanzen" ("Surface-active Substances"), Chemische Taschenbücher 14 (Chemical Paperbacks 14), Verlag Chemie Weinheim (1971)).

In an alkaline reaction medium, it is also possible to employ, if appropriate, emulsifiers belonging to the surface-active class of carboxylates, such as sodium laurate, sodium stearate, alkali metal salts of modified resin acids which are derived from abietic acid (Houben-Weyl, Volume XIV/1, page 195 (1961)) or dimerization products of unsaturated fatty acids, such as, for example, of linoleic acid (Houben-Weyl, Volume XIV/1, page 203 (1961)).

It is, of course, also possible to employ mixtures of these emulsifiers.

Preferred emulsifiers which can be used according to the invention consist, for example, of the polysulphonate and of alkylsulphonates and alkylsulphates. Emulsifier systems consisting of the polysulphonate and alkylsulphonates, salts of fatty acids, such as, for example, sodium laurate, or salts of resin acids are preferably employed in an alkaline medium.

It is also possible to employ non-ionic surface-active agents, in addition to the customary anionic emulsifiers. Non-ionic surface-active agents include substances from the surface-active class of polyglycol ethers, alkylphenol polyglycol ethers, acyl polyglycol ethers, hydroxyalkyl-fatty acid amides and their ethylene oxide adducts, fatty amine polyglycol ethers and polyaddition products of ethylene oxide and propylene oxide.

Preferred emulsifier combinations according to the invention then consist, for example, of equal portions of an anionic surface-active agent, a non-ionic surface-active agent and a polysulphonate. Combinations consisting of a p-nonylphenol which is reacted with 10 to 30 mols of ethylene oxide, an alkylsulphate or an alkylsulphonate with 10 to 18 carbon atoms and sodium polysulphonates are preferably used for the preparation of relatively coarse-particled and very stable dispersions.

With the aid of the emulsifier systems according to the invention, it is possible to convert monomers which can be homopolymerized and copolymerized in emulsion by free radicals into the corresponding polymer dispersions. The products can be homopolymers or copolymers and can be thermoplastic or thermosetting resins.

Examples which may be mentioned of monomers which can be polymerized in the presence of the emulsifier system according to the invention are: ethylene, butadiene, chloroprene, styrene, 1-methylstyrene, vinyl chloride, vinylidene chloride, vinyl acetate, vinyl propionate, vinyl esters of mixtures of synthetic saturated monocarboxylic acids with chain lengths of about 9 to 11 carbon atoms, which are prepared, for example, from an olefine cut with 8 to 10 carbon atoms by a modified "Koch reaction", acrylonitrile, methacrylonitrile, acrylates, such as methyl acrylate, ethyl acrylate, n-butyl acrylate and 2-ethylhexyl acrylate, and methacrylates, such as methyl methacrylate, ethyl methacrylate and n-butyl methacrylate.

In addition to the monomers mentioned or mixtures thereof, it is also possible, in a manner which is in itself known, for water-soluble monomers, such as methacrylic acid, acrylic acid, methacrylamide, acrylamide, maleic acid half-esters and itaconic acid, to be employed in customary amounts, for example 2 to 6% by weight, relative to the total monomer mixture for the polymerisation.

Furthermore, monomers having a crosslinking action, such as, for example, divinylbenzene, divinyl ether, diol-diacrylates, triallyl compounds, such as, for example, triallyl cyanurate, N-methylol acrylamide, N-methylolmethacrylamide or the ethers of these methylol compounds, can be employed, in addition to the monomers hitherto mentioned, for the preparation of crosslinked polymers or polymers which can be subsequently crosslinked.

According to the invention, it is thus possible to prepare polymers which have particular properties as a result of the particle size established in a definite manner. These properties are essentially determined by the size of the latex particles. It is known that the particle size of the dispersed polymer and its particle size distribution is of decisive importance for the technological properties of dispersions of plastics (F. Hölscher, Dispersionen synthetischer Hochpolymerer (Dispersions of Synthetic High Polymers), Section I, Eigenschaften, Herstellung und Prüfung (Properties, Preparation and Testing), Springer-Verlag, Berlin, Heidelberg, New York, 1969, page 8, last paragraph). The particle size and particle size distribution in the dispersion are greatly dependent on the nature of the preparation of a dispersion.

Preferred dispersions of plastics which can be prepared according to the invention are: polyvinyl chloride dispersions, n-butacrylate/styrene/methacrylic acid copolymer dispersions, butadiene/styrene/copolymer dispersions which have a high and low styrene content and can contain carboxyl groups incorporated in the copolymer; polystyrene dispersions, styrene/divinylbenzene/methacrylic acid copolymer dispersions, crosslinked and non-crosslinked poly-n-butyl acrylate dispersions, styrene/acrylonitrile copolymer dispersions containing a predominant proportion of styrene; copolymer dispersions of methyl methacrylate with (meth)acrylates; copolymer dispersions of n-butyl acrylate with styrene, hydroxypropyl acrylate with methacrylic acid; copolymer dispersions of n-butyl acrylate with acrylonitrile and methacrylic acid; and copolymer dispersions of n-butyl acrylate with styrene, acrylonitrile and methacrylic acid.

The aqueous dispersions, according to the invention, of plastics are prepared in the presence of one or more initiators. Examples of initiators which may be mentioned are the substances or substance mixtures which are in themselves known and dissociate into free radicals under the influence of heat and initiate free radical polymerisation (literature: Houben-Weyl, Volume XIV/1 pages 209 to 297 (1961)).

It is thus possible to initiate the polymerization with water-soluble agents which form free radicals or with agents which form free radicals and are only very slightly soluble in water. Examples which may be mentioned of inorganic agents which form free radicals are peroxodisulphates, such as potassium peroxodisulphate, ammonium peroxodisulphate and sodium peroxodisulphate, or combinations of the initiators mentioned with reducing compounds, such as, for example, sodium bisulphite, sodium pyrosulphite, formamidinesulphinic acid and sodium formaldehyde-sulphoxylate.

Water-soluble derivatives of azodinitriles can also be used as initiators (Houben-Weyl, Volume XIV/1, pages 221 and 222 (1961)).

Hydrogen peroxide or organic peroxides, if appropriate in combination with reducing organic compounds, such as benzoin, mono- and di-hydroxyacetone, ascorbic acid, sorbose, fructose, glucose, mannose and heavy metal salts bonded in the form of complexes, such as, for example, iron-II salts complexed with salts of ethylenediaminetetraacetic acid, can be used to prepare dispersions which have a particularly low salt content.

Preferred initiators for the preparation of the aqueous dispersions, according to the invention, of plastics are potassium peroxodosulphate, sodium peroxodisulphate, ammonium peroxodisulphate or mixtures thereof, the said alkali metal peroxodisulphates in combination with sodium pyrosulphite, and tert.-butyl hydroperoxide in combination with sodium formaldehydesulphoxylate.

In addition to the initiators, compounds which regulate the molecular weight of the polymer, such as mercaptans, for example tert.-dodecylmercaptan and dodecylmercaptan, diisopropylxanthogen disulphide, methacrolein, oleic acid, carbon tetrachloride or carbon tetrabromide, can also be employed in combination with the polysulphonates according to the invention.

The average particle diameter of the dispersion particles in the dispersions of plastics can be established, according to the invention, by changing the polysulphonic acid content of the emulsifier system to a desired value in the range from 50 to 500 nm.

A process has thus been found for establishing an average particle diameter of dispersion particles in aqueous dispersions of plastics which are prepared by polymerization of the monomers of the plastic in the presence of water, an initiator and an emulsifier system, which is characterised in that the total amount of the initiator and of the emulsifier system, which contains a proportion of an alkali metal salt of a polysulphonic acid of an alkane of medium chain length, is kept approximately constant and the proportion of the alkali metal salt of the polysulphonic acid is changed in the range from 15 to 100 parts by weight, per 100 parts by weight of the total emulsifier system.

It is a considerable advantage of the process according to the invention and surprising that the total amount of the emulsifier system and of the initiator system can be kept approximately constant, the course achieved for the polymerization reaction is satisfactory with regard to the rate of polymerization and, depending on the particular composition of the emulsifier system, dispersions of plastics which have a defined average particle diameter which is in each case different, according to the particular composition of the emulsifier system, are nevertheless obtained.

The emulsifier system can be employed in a total amount of 0.05 to 10 parts by weight, per 100 parts by weight of the water present in the polymerization. Contents of 0.5 to 5 parts by weight, per 100 parts by weight of the water present in the polymerization, are preferred.

The monomer content, relative to the total weight of monomer and water, is 5 to 50% by weight, preferably 10 to 35% by weight.

The greater the content of polysulphate in the emulsifier system, the greater is the average particle diameter of the dispersion particles. In an individual case, the amount of polysulphonate to be fixed in the emulsifier system depends on the particular polymerization conditions and on the nature and amount of the particular monomers used for the polymerization, and this amount can easily be fixed within the limits according to the invention by preliminary experiments.

Dispersion particles in the range from about 150 to 300 nm are preferably produced with the aid of the process according to the invention.

The expensive seeding latex process can thus advantageously be dispensed with.

However, it is of course also possible, in addition to the process according to the invention, to influence the particle size of the latex particles by varying the total amount of the emulsifier.

In another embodiment of the process according to the invention, a defined seeding latex with large latex particles can be prepared with the aid of the process according to the invention and this latex can be converted into an even more coarsely-particled defined form with the aid of the "seeding latex process".

In the case of a precisely fixed total concentration of the emulsifier system in water, a precisely fixed polysulphonate content in the emulsifier system and a precisely fixed initiator concentration in the water at the start of the polymerization, the resulting particle size in the dispersion at the end of the polymerization furthermore also depends, of course, on the ratio of monomer to water, which was fixed at the start of the polymerization.

If, therefore, the preparation of a particularly coarse-particled dispersion is intended, for example, as small as possible an amount of a seeding latex which is as coarse-particled as possible is produced in an preliminary emulsion polymerization with very small amounts of an emulsifier system consisting predominantly of the polysulphonate, and thereafter, this seeding latex is coarsened further in a manner which is in itself known with the aid of the seeding latex process, water, monomer, emulsifier solution and, if appropriate, additional initiator solution being added.

In a particular embodiment of the process according to the invention, a seeding latex with a defined diameter of the individual particles is thus first prepared by the process according to the invention, and thereafter, particles up to a diameter of about 1,000 nm can be prepared by the seeding latex process which is in itself known.

The process according to the invention can be used technologically as a discontinuous, semicontinuous or completely continuous process.

In the case of the discontinuous and semicontinuous process, the emulsifier combinations according to the invention are preferably employed in the first phase of the polymerisation, which is called the "particle formation period" (G. Henrici-Olivé and S. Olivé, Polymerisation, Katalyse-Kinetic-Mechanismen (Polymerization, Catalysis-Kinetics-Mechanisms), Chemische Taschenbücher (Chemical Paperbacks), Verlag Chemie Weinheim/Bergstrasse, No. 8, pages 72–77. Known emulsifiers which are free from polysulphonates can also be subsequently metered in to stabilize the dispersions in the "period of constant rate of polymerization".

According to a preferred embodiment of a continuous process, the polymerization is carried out in several polymerisation chambers connected in series, dispersion particles of the desired average particle size being formed in the first polymerisation chamber using polysulphonate-containing emulsifier systems according to the invention. Reaction mixture passes from the first to the second, from the second to the third, from the third to the fourth etc. reaction chamber at a rate corresponding to that at which the starting components are introduced into the first reaction chamber.

Such continuous processes in cascades of stirred kettles or autoclaves are in themselves known and are used, for example, for the preparation of butadiene/styrene dispersions (Chemische Technologie (Chemical Technology), Winnacker-Küchler, Carl Hanser Verlag, Munich, 1960, page 388 et seq.).

The polymerization can, of course, also take place in reactors which are divided into individual chambers in which thorough mixing is effected by a common stirrer shaft (German Patent Specification No. 1,125,175).

It is also possible to carry out a continuous polymerization in a single reactor through which the reactants flow and are thoroughly mixed continuously. Coarse-particled polyvinyl chloride dispersions can be prepared particularly advantageously in such a reactor.

The process according to the invention for establishing a defined particle diameter of dispersion particles of an aqueous dispersion of a plastic can be carried out, for example, as follows.

The polymerization is carried out in a measurement series under comparable conditions, the total amount of emulsifier remaining constant but the polysulphonate content varying. The particle diameters of the dispersions obtained are determined by known methods in a manner which is in itself known (in an ultracentrifuge or electron microscope, from the angular variation of light scattering or by laser correlation spectroscopy). The conditions for preparation of a particular defined particle diameter can be established for each specific polymer by correlation of the resulting particle diameters in the measurement series with the polysulphonate content of the total amount of emulsifier.

Uniform dispersions of approximately constant average particle diameter are obtained by the process according to the invention. Since the physical properties, which are of particular importance for the application, of dispersions of plastics depend not only on the average particle size but also on the proportions of particles which deviate from the average diameter, by mixing different dispersions with in each case an approximately constant particle diameter one can prepare new dispersions of plastics which have a defined distribution of latex particles of various sizes. The dispersions thus obtained are independent of the unavoidable diameter distribution of a particular preparation process and can be prepared in any desired particle size distribution.

The process according to the invention can also be used for the preparation of dispersions with a slightly increased average particle diameter. By slightly increasing the particle diameter, which can easily be carried out in a defined manner with the aid of the process according to the invention, the ability to flow can be favourably influenced whilst the other properties are virtually unchanged.

Coarse-particled polyvinyl chloride dispersions with latex particle diameters of 500 to 2,000 nm are particularly suitable for the preparation of polyvinyl chloride plastisols (Houben-Weyl, Volume XIV/1, page 878 (1961)), since the ability of polyvinyl chloride plastisols obtained from emulsion polymers to flow increases as the particle size increases. Particularly favourable paste viscosities are obtained with the aid of the process according to the invention.

Coarse-particled dispersions based on acrylate or butadiene can be used in a manner which is in itself known as the graft base in the preparation of plastics of high impact strength. The soft particles of the graft base, which in most cases are crosslinked chemically on the inside, must have a certain minimum particle size in order to achieve high notched impact strength values ("Die Makromolekulare Chemie", 101 (1967), pages 200 to 213.; and "Angew. Makromolekulare Chemie" 29/30 (1973), pages 1 to 23). The acrylate or butadiene dispersions prepared by the process according to the invention can be particularly advantageously used as graft bases.

It is also possible to build up dispersion particles which are structured in the form of spherical shells and have a soft core and hard shell or hard core and soft shell by the process according to the invention.

EXAMPLES (A) Starting substances (Monomers, water, initiator)

Commercially available monomers in the freshly distilled state were used in the following experiments. According to analysis by gas chromatography, the monomers were in most cases over 99.9% pure.

The water employed in the experiments was completely desalinated and was boiled up before use, $N_2$ being bubbled through. The potassium peroxide-sulphate used was analytically pure.

(B) Emulsifiers

To prepare the emulsifier systems used in the examples, emulsifiers containing polysulphonate were mixed with commercially available emulsifiers. The preparation of two suitable polysulphone-containing emulsifier systems which, if desired, can be combined with customary emulsifiers is described below:

B-1. Emulsifier system containing about 70% by weight of sodium alkanepolysulphonate A mixture of linear alkanes (8 to 20 carbon atoms in the molecule, the average number of carbon atoms is 15) is sulphochlorinated, in the presence of light, with a gas mixture consisting of 1.1 parts by weight of sulphur dioxide and 1.0 part by weight of chlorine at a temperature of 30° to 40° C., whilst stirring and simultaneously cooling. The sulphochlorination is carried out until the reaction mixture has a density of 1.165 g/cm$^3$ at 45° C. The sulphochloride content is then 15.5 to 16.0% by weight.

200 g of the sulphonation mixture are added dropwise to 144 g of 50% strength by weight sodium hydroxide solution, which has been warmed to 50° to 60° C. The reaction mixture is kept at a temperature of 95° to 100° C. by cooling. When the reaction has ended, the reaction mixture is adjusted to a pH value of 9 to 10 by adding concentrated sodium hydroxide solution. The reaction mixture is then cooled to 60° to 70° C.

Sodium chloride precipitates in this temperature range and is filtered off or centrifuged off. The solution, which is free from sodium chloride, is evaporated to dryness in vacuo. 220 g of sodium alkane-sulphonate are thereby obtained. The sodium alkane-sulphonate consists of: 28% by weight of sodium alkane-monosulphonate and 67% by weight of sodium alkane-polysulphonate.

The sodium alkanesulphonate thus prepared is used as an emulsifier, by itself or with the addition of sodium alkane-monosulphonate or other anionic and/or non-ionic surface-active agents which are in themselves known, for the polymerization of monomers in emulsion.

B-2 Preparation of an emulsifier system containing about 90% by weight of sodium alkanepolysulphonate A mixture of linear alkanes (8 to 20 carbon atoms in the molecule, the average number of carbon atoms is 15) is sulphochlorinated, in the presence of light, with a gas mixture consisting of 1.1 parts by weight of sulphur dioxide and 1.0 part by weight of chlorine at a temperature of 30° to 40° C., whilst stirring and simultaneously cooling. The sulphochlorination is carried out until the reaction mixture has a density of 1.250 g/cm$^3$ at 45° C. The sulphochloride content is then 18.0–18.5% by weight.

200 g of the sulphonation mixture are added dropwise to 170 g of 50% strength by weight sodium hydroxide solution, which has been warmed to 50° to 60° C. The reaction mixture is kept at a temperature of 95° to 100° C. by cooling. When the reaction has ended, the reaction mixture is adjusted to a pH value of 9 to 10 by adding concentrated sodium hydroxide solution. The reaction mixture is then cooled to 60° to 70° C.

Sodium chloride is precipitated in this temperature range and is filtered off or centrifuged off. The sodium chloride free solution is evaporated to dryness in vacuo. A mixture of 8 g of NaCl and 139 g of sodium alkanesulphonate is thereby obtained. The sodium alkanesulphonate consists of: 13.2% by weight of sodium alkane-monosulphonate and 86.8% by weight of sodium alkane-polysulphonate.

The sodium alkanesulphonate thus obtained is used as an emulsifier, by itself or with the addition of sodium alkane-monosulphonate or other anionic and/or non-ionic surface-active agents which are in themselves known, for the polymerisation of monomers in emulsion.

(C) Procedure for the polymerization experiments

Series polymerization experiments which are described in the following examples were carried out in corked glass flasks with a capacity of 500 ml and with an additional crown cork closure (in this context, compare Houben Weyl, Methoden der organischen Chemie (Methods of Organic Chemistry) Volume XIV, 1 page 147 (1961)). The flasks, inserted in steel cartridges, were rotated in a thermostatically controlled water-bath at a speed of 25 revolutions per minute (abbreviation: r/m or rpm). The temperature of the water-bath in which the flasks were periodically immersed was kept constant. All the batches were carried out with exclusion of atmospheric oxygen. If the procedure was otherwise, this is mentioned expressly in the subsequent examples.

(D) Evaluation of the experimental results

After cooling to room temperature, the 500 ml flasks were emptied completely, the contents were sieved through a Perlon fabric with a square mesh width of 30μ and the coagulate which remained was washed and dried to constant weight. If the polymerization was carried out in stirred vessels or autoclaves, any coagulate deposited on the stirrers, immersion heaters and walls was also taken into consideration.

The solids content (dry residue in % of the weight of latex) of the latex which in each case filtered through the Perlon was determined, as well as the particle size, by laser correlation spectroscopy. In this laser light scattering method, information from the scattering particles (for example latex particles) is obtained from the fluctuations of the scattered light with respect to time, which is recorded by a photomultiplier. The fluctuations in scattered light are based on the irregular Brownian motion of the particles. The translatory diffusion coefficient D of the particles, which is linked with particle diameter d, is accordingly obtained from autocorrelation analysis of the scattered light signal.

The second cumulant (C 2) of the correlation function, which is a relative measure of the width of the particle size distribution can be determined at the same time (literature: H. Z. Cummins, E. R. Pike, Hsg. Photon Correlation and Light Beatin Spectroscopy, Plenum Press 1974; B. Chu, Laser Light Scattering, Academic Press, 1974; and D. E. Koppel J. Chem. Phys. 57 (1972) 4,814). The closer the value of C 2 is to zero, the more uniform are the dispersion particles and the narrower is the diameter distribution curve.

(E) Embodiment Examples

EXAMPLE 1

The poly/mono-sulphonate ratio of an emulsifier which is prepared according to instructions B.2. and has a high polysulphonate content is adjusted to 85/15, the emulsifier is diluted to a 10% strength aqueous solution and increasing amounts of the solution are added to a 10% strength sodium lauryl-sulphate solution such that the total amount of emulsifier in the batch remains constant.

| Batches: | |
|---|---|
| Deionised water | 118.3 g |
| 10% strength polysulphonate/monosulphonate emulsifier, poly/mono ratio = 85/15 | 0 to 130 g |
| 10% strength solution of sodium lauryl-sulphate from | 130 to 0 g |
| (Sum of the weights of the two 10% strength emulsifier solutions in each batch is always 130 g) | |
| 2% strength potassium peroxodisulphate solution | 26.2 g |
| n-Butyl acrylate | 112.5 g |
| Total weight of the batch: | 387.0 g |

For the polymerization process, compare the procedure in C. The composition of the total emulsifier system thus varies in each experiment, and its concentration in water is the same in each experiment (compare Table I).

The reaction parameters are as follows:

| | |
|---|---|
| Total emulsifier concentration: [E] = (Monosulphonate + polysulphonate + alkyl-sulphate) | 49.8 g/1,000 g of water |
| Amount of emulsifier, per 100 parts by weight of water: | 5 parts by weight |
| Content of an alkali metal salt of a polysulphonic acid: | 0 to 85 parts by weight |
| per 100 parts by weight of the total emulsifier system, | |
| Weight ratio of monomer/monomer + water = | 0.3 |
| Polymerization time: | 7 hours |
| Polymerization temperature: | 70° C. |
| Speed of rotation of the flasks: | 25 (revolutions per minute) |
| Flask volume: | 500 ml |
| Maximum solids content which can be achieved in the latices: | 32.56% by weight |

The results of the polymerization experiments are now summarized in Table I.

The percentage composition of the emulsifier system according to the invention is given in the first 3 columns; the batches in lines 1 and 2 do not represent an emulsifier system according to the invention since they have a polysulfonate content of less than 15% by weight.

As can be seen from column 4, the solids content of the dispersions remains approximately constant and is independent of the composition of the particular emulsifier system. As the polysulphonate content of the emulsifier system increases, the coagulate content in the dispersions increases somewhat (compare column 5), but remains slight throughout.

The establishment, according to the invention, of particle size can be seen from column 6. It is predominantly in the range from about 50 to 300 nm. The dispersion particle diameter initially rises only slowly as the amount of polysulphonate added increases, for example in the range from 15 to 65% by weight of polysulphonate in the emulsifier system. The latex particle diameter rises more steeply from a polysulphonate content of about 65% by weight.

As can be seen from column 7, C 2, the measure of the width of the latex particle diameter distribution, does not change significantly.

Before being opened, the flasks, which were filled to the same level, were shaken vigorously for 20 minutes. Thereafter, the time which passed until the foam collapsed was recorded. This time is given in column 8 for the particular experiments, as a measure of the tendency of the latex to form a stable foam.

From column 8, it can be seen that the addition of polysulphonate to the emulsifier system initially has an anti-foaming effect, which is very desirable. The tendency to foam (increase in the number of seconds before the foam disappears) only increases again at high polysulphonate contents, as a result of the decreasing internal surface of the dispersions.

TABLE I

| Composition of the emulsifier system (% by weight) | | | Solids content of the latex | Coagulate content (% by weight), | Latex particle diameter d (nm) | C 2 Numerical measure of the d | Ability to form |
|---|---|---|---|---|---|---|---|
| Poly-sulphonate | Mono-sulphonate | Na lauryl-sulphate | (% by weight) | relative to the monomer | (average value) | distribution | foam (seconds) |
| 0 | 0 | 100 | 31.2 | 0 | 51 | 0.09 | 187 |
| 13.1 | 2.3 | 84.6 | 31.2 | 0 | 50 | 0.11 | 140 |
| 32.7 | 5.8 | 61.5 | 31.4 | 0 | 59 | 0.05 | 95 |
| 42.5 | 7.5 | 50 | 31.3 | 0 | 72 | 0.05 | 86 |
| 52.3 | 9.2 | 38.5 | 31.5 | 0 | 83 | 0.07 | 82 |
| 65.5 | 11.5 | 23.0 | 31.7 | 0.2 | 129 | 0.03 | 80 |
| 68.7 | 12.1 | 19.2 | 31.6 | 0.3 | 135 | 0.04 | 78 |
| 71.9 | 12.7 | 15.4 | 31.4 | 0.4 | 175 | 0.03 | 65 |
| 75.2 | 13.3 | 11.5 | 31.6 | 0.3 | 196 | 0.06 | 88 |
| 78.5 | 13.8 | 7.7 | 31.7 | 0.2 | 237 | 0.07 | 99 |
| 81.8 | 14.4 | 3.8 | 31.8 | 0.6 | 285 | 0.09 | 150 |

TABLE I-continued

| Composition of the emulsifier system (% by weight) | | | Solids content of the latex | Coagulate content (% by weight), | Latex particle diameter | C 2 Numerical measure | Ability to form |
|---|---|---|---|---|---|---|---|
| Poly-sulphonate | Mono-sulphonate | Na lauryl-sulphate | (% by weight) | relative to the monomer | d (nm) (average value) | of the d distribu-tion | foam (seconds) |
| 85 | 15 | 0 | 31.0 | 0.7 | 310 | 0.10 | 205 |

(compare the explanations in the text of Example 1)

EXAMPLE 2

An emulsifier which is prepared according to instructions B.2. and has a high polysulphonate content is mixed with an alkylmonosulphonate of the same carbon chain length such that 4 emulsifier systems (A to D) of different polysulphonate/monosulphonate ratios result:

| Emulsifier system | A | B | C | D |
|---|---|---|---|---|
| % by weight of monosulphonate | 85 | 50 | 30 | 15 |
| % by weight of disulphonate | 15 | 50 | 70 | 85 |

Various monomers and monomer mixtures are now polymerized with the aid of these emulsifier systems A to D, according to the polymerization conditions C and the following recipe:

| | |
|---|---|
| Deionised water | 118.3 g |
| 10% strength aqueous emulsifier system | 131.25 g |
| 2% strength aqueous $K_2S_2O_8$ solution | 26.20 g |
| Monomer or monomer mixture | 112.5 g |
| Total weight of each batch: | 388.25 g |

The composition of total emulsifier system thus varies in each batch, but the total emulsifier concentration is in each case the same in each experiment (compare Table II).

The reaction parameters are as follows:

| | |
|---|---|
| Total emulsifier concentration: [E] = (Polysulphonate + monosulphonate) | 50 g/1,000 g of $H_2O$ |
| Amount of emulsifier, per 100 parts by weight of $H_2O$: | 5 parts by weight |
| Content of an alkali metal salt of a polysulphonic acid: | 15 to 85% by weight |
| relative to the weight of the emulsifier system | |
| Initiator concentration: [I] = | 2 g/1,000 g of $H_2O$ |
| Weight ratio of monomer/(monomer + water) = | 0.3 |
| Polymerization time: | 7 hours |
| Polymerization temperature: | 70° C. |
| Speed of rotation of the flasks: | 25 revolutions per minute |
| Maximum solids content which can be achieved: | 32.49% by weight |
| Reaction vessel volume: | 500 ml |

The results of the experimental series are summarised in Table II. As the polysulphonate content of the emulsifier system increases, the particle diameter of the particular dispersions increases.

The average particle diameter d of the dispersions can be established at any value, for example in the range from 50 to 300 nm, depending on the monomer employed. In the case of emulsion polymerisation of methyl methacrylate, dispersions with average particle diameters of greater than 500 nm are formed. In this case, the coagulate content increases considerably as the polysulphonate content increases (compare line 5, Table II).

TABLE II

| | Monomer | Composition of the emulsifier system polysulphonate : monosulphonate (% by weight ratio) | | | | | |
|---|---|---|---|---|---|---|---|
| | | Solids content % | Coagulate %, relative to monomer | Particles* d [nm] | Solids content % | Coagulate %, relative to monomer | Particles* d [nm] |
| | | 15:85 | | | 50:50 | | |
| a | Ethyl acrylate | 32.2 | 0 | 64 | 32.1 | 1.0 | 152 |
| b | n-Butyl acrylate | 32.3 | 0 | 60 | 32.2 | 0 | 105 |
| c | tert.-Butyl acrylate | 30.0 | 0 | 55 | 28.0 | 0 | 100 |
| d | 2-Ethylhexyl acrylate | 32.0 | 0 | 49 | 32.3 | 0 | 80 |
| e | Methyl methacrylate | 32.1 | 0 | 62 | 31.5 | 0.7 | 190 |
| f | n-Butyl methacrylate | 32.2 | 0 | 52 | 32.3 | >0.1 | 96 |
| g | Styrene | 32.2 | 0 | 63 | 32.3 | >0.1 | 75 |
| h | Styrene:n-butyl acrylate mixture, weight ratio of 1:1 | 31.9 | 0 | 58 | 32.2 | >0.1 | 115 |
| i | n-Butyl acrylate: acrylonitrile mixture, weight ratio of 2:1 | 31.6 | 0 | 61 | 31.8 | 0.1 | 105 |
| | | 70:30 | | | 85:15 | | |
| a | Ethyl acrylate | 36.8 | 5.2 | 200 | 32.9 | 8.2 | 290 |
| b | n-Butyl acrylate | 32.2 | 0 | 150 | 32.9 | 0.8 | 260 |
| c | tert.-Butyl acrylate | 27.0 | 0 | 150 | 27.3 | 0.4 | 240 |
| d | 2-Ethylhexyl acrylate | 31.8 | 0 | 110 | 32.3 | 0 | 133 |
| e | Methyl methacrylate | 29.1 | 0.9 | 340 | 30.0 | 3.0 | 950 |
| f | n-Butyl methacrylate | 32.0 | 0 | 130 | 31.8 | 0.3 | 288 |

TABLE II-continued

| | | Composition of the emulsifier system polysulphonate : monosulphonate (% by weight ratio) | | | | |
|---|---|---|---|---|---|---|
| Monomer | Solids content % | Coagulate %, relative to monomer | Particles* d [nm] | Solids content % | Coagulate %, relative to monomer | Particles* d [nm] |
| g Styrene | 31.7 | 0 | 95 | 32.4 | 1.1 | 110 |
| h Styrene:n-butyl acrylate mixture, weight ratio of 1:1 | 31.4 | 0 | 150 | 32.1 | 0.1 | 260 |
| i n-Butyl acrylate: acrylonitrile mixture, weight ratio of 2:1 | 29.5 | 3.2 | 220 | 29.5 | 3.5 | 270 |

*d is the average dispersion particle diameter in nm
(Compare the explanations in the text of Example 2)

EXAMPLE 3 (with comparison examples)

The emulsifier which is prepared according to instruction B.1. and which contains about 70% by weight of sodium alkanepolysulphonate and about 30% by weight of sodium alkanemonosulphonate is used in four different emulsifier concentrations, in particular 50, 10, 1.0 and 0.5 [g/1,000 g of $H_2O$], for the polymerization of styrene (compare Table III).

The effectiveness of the emulsifier system according to the invention is compared with that of 6 different anionic emulsifiers which are employed under the same polymerisation conditions. These anionic emulsifiers have no polysulphonate content.

| Batches: | |
|---|---|
| Deionised water: | 236.7 |
| Emulsifier(s) (100% of detergent substance) | 0.13; 0.26; 2.62; or 13.7 (compare Table III) |
| 2% strength $K_2S_2O_8$ solution: | 26.3 |
| Styrene | 112.5 |

The composition of each emulsifier system thus remains the same and the emulsifier concentrations are in each case different for the same emulsifier system.

The reaction parameters are as follows:
Total emulsifier concentration in each emulsifier system: 50; 10; 1.0; 0.5 [g/1,000 g of $H_2O$]
Total amount of emulsifier, per 100 parts by weight of water: 5; 1.0; 0.1; 0.05 parts by weight
Weight ratio of monomer/(monomer+water)=0.3
Polymerization time: 7 hours
Polymerization temperature: 70° C.
Speed of rotation of the flasks: 25 revolutions per minute
Reaction vessel volume: 500 ml
Maximum solids contents which can be achieved: 30.12; 30.15; 30.58; 32.46% by weight

TABLE III

| | Total emulsifier concentration (g of emulsifier/ 1,000 g of water) | | | | | | | | | | | |
|---|---|---|---|---|---|---|---|---|---|---|---|---|
| | 50 | | | 10 | | | 1 | | | 0.5 | | |
| Emulsifier system | S(%) | C(%) | d (nm) | S(%) | C(%) | d (nm) | S(%) | C(%) | d (nm) | S(%) | C(%) | d (nm) |
| Emulsifier according to instruction B-1 (according to the invention) | 32.1 | 0 | 150 | 30 | 1.5 | 155 | 28.5 | 3.0 | 480 | 27.0 | 0.3 | 530 |
| Sulphosuccinic acid dioctyl ester | 31.9 | 0 | 75 | coagulation | | | coagulation | | | coagulation | | |
| Sodium p-dodecylbenzenesulphonate | 32.0 | 0 | 70 | 30.2 | 0.5 | 95 | coagulation | | | coagulation | | |
| $CH_3-(CH_2)_{11}-O-(CH_2-CH_2-O)_{10}-OSO_3^{\ominus} NH_4^{\oplus}$ | 32.0 | 0 | 65 | 32.5 | 1.5 | 85 | coagulation | | | coagulation | | |
| Mixture of secondary paraffin monosulphonates with 14 to 16 C atoms | 32.1 | 0 | 65 | 30.1 | 0.5 | 90 | coagulation | | | coagulation | | |
| Sodium lauryl-sulphonate | 32.0 | 0 | 60 | 30.0 | 0.2 | 77 | coagulation | | | " | | |
| 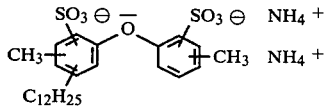 | 32.0 | 0 | 50 | 30.0 | 0.7 | 81 | coagulation | | | " | | |

Explanations for Table III:
S(%) = solids content of the dispersion;
C(%) = coagulate content (%), relative to the monomer;
d(nm) = average latex particle diameter in nm.

The results of the polymerization experiments are summarized in Table III. Each line in Table III relates to a different emulsifier system. The four main columns show the solids content (S%), coagulate content (% by weight, relative to the monomer) and the average diameter of the dispersion particles, d (in nm), as a function of the total emulsifier concentration (50:10:1:0.5).

When the emulsifier system according to the invention is used, dispersions with particle diameters of 150 to 530 nm are formed, depending on the emulsifier concentration (compare line 1, Table III).

In contrast, when customary anionic emulsifiers are used, it is not possible to obtain coarse-particled dispersions of plastics in a comparable manner by reducing the emulsifier content. Rather, when customary emulsifiers are used at emulsifier concentrations of about 1 g/1,000 g of water, complete coagulation of the particular batches occur.

Example 4 (with comparison example)

The mode of action of the emulsifier system according to the invention which is prepared in accordance with instruction 2.1. is compared with that of an alkyl-monosulphonate (in this context, compare Houben-Weyl, Methoden der organischen Chemie (Methods of Organic Chemistry), 4th Edition, Volume XIV/1, Makromolekulare Stoffe (Macromolecular Substances), Georg Thieme Verlag, Stuttgart, 1961, page 871):

The following components are initially introduced into an autoclave which is provided with a blade stirrer and has a capacity of 5.5 to 6.1:

| | |
|---|---|
| Deionised water: | 2,325.5 g |
| 10% strength aqueous emulsifier solution: | 750.0 g |
| Potassium peroxodisulphate: | 3.0 g |
| Sum of the components: | 3.078.5 g |

The atmospheric oxygen is removed from the space in the autoclave by evacuation and flushing with nitrogen, 1,500 g of vinyl chloride are then added and the reaction mixture is warmed to 48° C., whilst stirring (125 revolutions per minute).

After 10 to 12 hours, the polymerization has ended, which can be recognized by the drop in pressure of the contents of the autoclave.

If the commercially available alkylmonosulphonate with about 12 to 18 C atoms in the unbranched chain is used as the emulsifier, a coagulate-free, viscous, extremely fine-particled polyvinyl chloride dispersion with a dispersion particle diameter of about 50 nm and a solids content of about 34% by weight results. This dispersion is very unstable towards shearing stress.

In contrast, if an emulsifier system according to the invention (compare instruction B-1) is employed, a coagulate-free approximately 32% strength polyvinyl chloride dispersion which has dispersion particle diameters of 250 nm, is readily mobile and has a very good stability to shearing stress is formed.

EXAMPLE 5

The method according to the invention, of establishing the average dispersion particle diameter with the aid of polysulphonates can also be illustrated using examples of emulsion polymerization in the presence of a seeding latex.

A monomer mixture consisting of 51% by weight of n-butyl acrylate, 45% by weight of styrene and 4% by weight of methacrylic acid is summarized.

The emulsifier systems A to D, as described in Example 2, are employed.

10% by weight of the monomer mixture are initially introduced to form a seeding latex, a further amount of 90% by weight is metered in and the seeding latex particles present are polymerised.

When conversion of the monomer is complete, the solids content of the seeding latex is about 10% by weight, and the final latex has a solids content of about 46% by weight.

The emulsifier concentration in the quantity of water initially introduced is about 9 g/1,000 g of water, and the initiator concentration is 1.5 g/1,000 g of water.

The polymerization experiments are carried out at 75° C. in accordance with the recipes summarized in Table IV, in 1.5 l three-necked flasks with blade stirrers operating at 250 revolutions per minute, reflux condensers, internal thermometers and dropping funnels for solutions 5.3., 5.4. and 5.5.

TABLE IV

| | DISPERSION | 5a | 5b | 5c | 5d |
|---|---|---|---|---|---|
| | Deionised water | 400 | 400 | 400 | 400 |
| | Emulsifier mono/poly-sulphonate 85:15 | 4 | — | — | — |
| 5.1 | Emulsifier mono/poly-sulphonate 50:50 | — | 4 | — | — |
| | Emulsifier mono/poly-sulphonate 30:70 | — | — | 4 | — |
| | Emulsifier mono/poly-sulphonate 15:85 | — | — | — | 4 |
| | Styrene | 22.5 | 22.5 | 22.5 | 22.5 |
| 5.2 | n-Butyl acrylate | 25.5 | 25.5 | 25.5 | 25.5 |
| | Methacrylic acid | 2.0 | 2.0 | 2.0 | 2.0 |
| 5.3 | Deionised water | 50.0 | 50.0 | 50.0 | 50.0 |
| | $(NH_4)_2S_2O_8$ | 0.7 | 0.7 | 0.7 | 0.7 |
| | Styrene | 202.5 | 202.5 | 202.5 | 202.5 |
| 5.4 | n-Butyl acrylate | 229.5 | 229.5 | 229.5 | 229.5 |
| | Methacrylic acid | 18.0 | 18.0 | 18.0 | 18.0 |
| | Deionised water | 140.0 | 140.0 | 140.0 | 140.0 |
| | $(NH_4)_2S_2O_8$ | 2.3 | 2.3 | 2.3 | 2.3 |
| | Emulsifier mono/poly-sulphonate 85:15 | 3.5 | — | — | — |
| 5.5 | Emulsifier mono/poly-sulphonate 50:50 | — | 3.5 | — | — |
| | Emulsifier mono/poly-sulphonate 30:70 | — | — | 3.5 | — |
| | Emulsifier mono/poly-sulphonate 15:85 | — | — | — | 3.5 |
| | Solids content (% by weight) | 46.3 | 46.3 | 46.3 | 46.3 |
| | Coagulate (g) | 3.5 | 4.0 | <0.1 | <0.1 |
| | Average dispersion particle diameter d(nm) | 92 | 133 | 260 | 280 |
| | Measure of the width of the particle size distribution: C2 | 0.07 | 0.03 | 0.02 | 0.01 |
| | Flow time in a flow cup according to DIN 53211, 4 mm nozzle; latex pH = 8.5 (seconds) | 24 | 14 | 13 | 12.5 |
| | Average film-forming temperature according to DIN 53787, 90 μ wet film thickness, air flow of | | | | |

TABLE IV-continued

| DISPERSION | 5a | 5b | 5c | 5d |
|---|---|---|---|---|
| 0.6 cm/seconds; temperature of the air entering: | | | | |
| 0° C.; latex pH = 8.5 | | 19.5 | 21 | 22 | 22 |

The particular emulsifier solution (compare Table IV, 5.1.) is initially introduced under nitrogen, the monomer mixture 5.2. (compare Table IV) is then added and the mixture is heated to 75° C.

After the polymerization temperature (75° C.) has been reached, the polymerization is initiated by adding the solution 5.3 (compare Table IV). An approximately 10% strength seeding latex is formed. As soon as the heat of polymerization has subsided, the monomer mixture 5.4. (compare Table IV) and the emulsifier/activator solution 5.5. (compare Table IV) is added dropwise in the course of 3 hours, the temperature of the reaction mixture being kept at 75° C.

When the addition of the streams of material 5.4. and 5.5. has ended, the mixture is subsequently stirred for a further 3 hours at 75° C. in order to bring the conversion of the monomer to completion.

Stable, almost coagulate-free dispersions, the particle sizes (compare Table IV, line 22) of which increase, according to the invention, with an increasing content of polysulphonate, were obtained.

If the dispersions are adjusted to a pH of 8.5 with approximately 20% strength aqueous $NH_3$ solution, a thickening, which depends on the size of the latex particle diameter, occurs (compare line 24, Table IV).

The average film-forming temperature (compare line 26, Table IV) also depends on the particle size.

EXAMPLE 6

Dispersions with solids contents of up to, for example, 50% by weight can be prepared by quite simple polymerization recipes with the aid of emulsifier systems according to the invention:

TABLE V

| Experiment number | 6 A | 6 B | 6 C | 6 D |
|---|---|---|---|---|
| 6.1 Deionised water | 1,500 g | 1,500 g | 1,500 g | 1,500 g |
| Emulsifier system according to instruction B-2 (70% by weight of polysulphonate) | 150 g | 75 g | 37.5 g | 15 g |
| $K_2S_2O_8$ | 3 g | 3 g | 3 g | 3 g |
| 6.2 n-Butyl acrylate | 750 g | 750 g | 750 g | 750 g |
| 6.3 n-Butyl acrylate fed in over a period of 60 minutes | 750 g | 750 g | 750 g | 750 g |

The aqueous emulsifier/activator solution (compare Table V, 6.1.) is introduced into a 3.5 l three-necked flask with a stirrer (250 revolutions per minute) reflux condenser, internal thermometer and dropping funnel for some of the n-butyl acrylate (compare Table V, 6.3.), followed by half of the total amount of n-butyl acrylate to be polymerized (compare Table V, 6.2). The emulsified mixture, consisting of 6.1. and 6.2., is heated to 70° C. When the polymerization has started, the remainder of the butyl acrylate is metered in over a period of 60 minutes and the mixture is subsequently stirred for a further 2 hours in order to bring the polymerization to completion.

The dispersions are characterised as follows:

| Dispersion | 6 A | 6 B | 6 C | 6 D |
|---|---|---|---|---|
| Coagulate (g) | 15 | 0.3 | 1.0 | 5.0 |
| Solids content % by weight | 52.2 | 50.8 | 50.3 | 50.2 |
| Latex particle diameter (nm) $\overline{K2}$ | 330 | 230 | 195 | 195 |
| Measure of the uniformity | 0.3 | 0.02 | 0.01 | 0.03 |

In the case of initial emulsifier concentrations in the range from 10 parts by weight to 5 parts by weight of emulsifier per 100 parts by weight of water, the particle size of the dispersion particles accordingly decreases with decreasing emulsifier concentration.

Compared with a latex prepared in a corresponding manner and containing about 30% by weight of solids (compare Table II, line 2, polysulphonate:monosulphonate ratio of 70:30), the size of the latex particles is presently increased by a factor of 1.3 to 2.2. The latex prepared with the highest emulsifier content, that is to say 6A, has a broader latex particle diameter distribution than the products 6B, 6C and 6D.

EXAMPLE 7

It will be shown that combinations of polysulphonates with customary anionic emulsifiers and non-ionic emulsifiers give coagulate-free dispersions with uniform latex particle diameters (compare Table VII, experiments a to f).

In these experiments, the particle size increases, according to the invention, with an increasing content of polysulphonate in the emulsifier system.

If the emulsifier system still contains virtually only polysulphonate and non-ionic emulsifier (compare Table VII, experiments h and i), relatively coarse-particled, coagulate-free dispersions are formed. If only a non-ionic emulsifier is employed (compare Table VII, experiment j), a coarse-particled dispersion with very non-uniform particles (C2 value is 0.6!) and a very large amount of coagulate (26 g) is formed.

Emulsifiers containing polysulphonate can also be advantageously combined with resin soaps (compare Table VII, experiments k to n). The uniformity of the latex particles is improved and the stability of the dispersions towards changes in pH is substantially increased by adding the polysulphonate. Remarkably, the latex particle diameters are not substantially reduced by the addition of disulphonate to the emulsifier system. This effect can be utilized for the preparation of dispersions which contain resin soaps, are coarsely dispersed and have an improved pH stability, for example for the preparation of coarse-particled butadiene dispersions or chloroprene dispersions.

The experiments indicated in Table VII were carried out according to instruction C.
Polymerization temperature: 70° C.
Polymerization time: 7 hours
Speed of rotation of the 500 ml flasks: 25 revolutions per minute Total emulsifier concentration (E) = 50 g/1,000 g of $H_2O$
Amount of emulsifier, per 100 parts by weight of water: 5 parts by weight.

TABLE VII

| | a | b | c | d | e | f | g | h | i |
|---|---|---|---|---|---|---|---|---|---|
| (g) of deionised water | 118.3 | 118.3 | 118.3 | 118.3 | 118.3 | 118.3 | 118.3 | 113.8 | 118.3 |
| (g) of sec. alkylmonosulphonate with 12 to 18 C atoms, 10% strength aqueous solution | 43.3 | 32.5 | 16.3 | 43.3 | 32.5 | 16.3 | — | — | — |
| (g) of a 10% strength aqueous solution of $C_9H_{19}$—C$_6H_4$—O—$(CH_2$—$CH_2$—O$)_{30}$—H* | 43.3 | 32.5 | 16.3 | — | — | — | — | — | — |
| (g) of a 10% strength aqueous solution of $C_9H_{19}$—C$_6H_4$—O$(CH_2$—$CH_2$—O$)_{20}$—H* | — | — | — | 43.3 | 32.5 | 16.3 | — | 52 | 78 |
| (g) of a 10% strength aqueous solution of the sodium salt of dehydroabietic acid (commercially available product) | — | — | — | — | — | — | — | — | — |
| (g) of a 10% strength aqueous solution of the emulsifier according to instruction B.1 (70% of polysulphonate) | 43.3 | 65.0 | 97.5 | 43.3 | 65.0 | 97.5 | 130 | 78 | 52 |
| (g) of a 2% strength aqueous $K_2S_2O_8$ solution | 26.2 | 26.2 | 26.2 | 26.2 | 26.2 | 26.2 | 26.2 | 26.2 | 26.2 |
| (g) of n-butyl acrylate | 112.5 | 112.5 | 112.5 | 112.5 | 112.5 | 112.5 | 112.5 | 112.5 | 112.5 |
| amount of latex (g) | 386 | 386 | 386 | 386 | 386 | 385 | 386 | 386 | 387 |
| precipitate (g) | 0 | 0 | 0 | 0 | 0 | 0 | 0 | 0 | 0 |
| solids content in the latex (%) | 32 | 32 | 32 | 32 | 32 | 32 | 32 | 32 | 32 |
| latex particle diameter (nm) | 87 | 95 | 126 | 87 | 98 | 129 | 160 | 150 | 161 |
| C 2 (measure of the uniformity of the latex particles) | 0.15 | 0.06 | 0.05 | 0.06 | 0.2 | 0.15 | 0.10 | 0.1 | 0.35 |

| | j | k | l | m | n |
|---|---|---|---|---|---|
| (g) of deionised water | 118.3 | 118.3 | 118.3 | 118.3 | 118.3 |
| (g) of sec. alkylmonosulphonate with 12 to 18 C atoms, 10% strength aqueous solution | — | — | — | — | — |
| (g) of a 10% strength aqueous solution of $C_9H_{19}$—C$_6H_4$—O—$(CH_2$—$CH_2$—O$)_{30}$—H | — | — | — | — | — |
| (g) of a 10% strength aqueous solution of $C_9H_{19}$—C$_6H_4$—O$(CH_2$—$CH_2$—O$)_{20}$—H | 130 | — | — | — | — |
| (g) of a 10% strength aqueous solution of the sodium salt of dehydroabietic acid (commercially available product) | — | 130 | 65 | 32.5 | 13 |
| (g) of a 10% strength aqueous solution of the emulsifier according to instruction 2.1. (70% of polysulphonate) | — | 0 | 65 | 97.5 | 117 |
| (g) of a 2% strength aqueous $K_2S_2O_8$ solution | 26.2 | 26.2 | 26.2 | 26.2 | 26.2 |
| (g) of n-butyl acrylate | 112.5 | 112.5 | 112.5 | 112.5 | 112.5 |
| amount of latex (g) | 325 | 387 | 381 | 382 | 387 |
| precipitate (g) | 26 | 1.6 | 1.1 | 0.4 | 0.3 |
| solids content in the latex (%) | 27 | 32 | 32 | 32 | 32 |
| latex particle diameter (nm) | 325 | 160 | 150 | 155 | 155 |
| C 2 (measure of the uniformity of the latex particles) | 0.6 | 0.43 | 0.05 | 0.06 | 0.10 |

Explanation of Table VII:
*about 30 or 20 ethylene oxide units per mol of p-nonylphenol

What is claimed is:

1. In a process for the preparation of an aqueous dispersion of a synthetic polymer by polymerization of a monomer or mixture of monomers thereof in an aqueous medium in the presence of an initiator and an emulsifier, the improvement wherein said emulsifier comprises an alkali metal salt of a polysulfonic acid of an alkane of 8 to 22 carbon atoms.

2. A process according to claim 1, wherein said emulsifier comprises 15 to 100 parts by weight of said alkali metal salt of polysulfonic acid per 100 parts by weight of emulsifier.

3. A process according to claim 3, wherein said emulsifier comprises 0.05 to 10 parts by weight per 100 parts by weight of water.

4. A process according to claim 1, wherein said alkali metal salt of polysulfonic acid of an alkane of chain length 8–22 carbon atoms is in admixture with another emulsifier.

5. A process according to claim 1, wherein said alkane has a chain length of 13 to 17 carbon atoms.

6. A process according to claim 3, wherein said emulsifier is present in an amount of 0.5 to 5 parts by weight per 100 parts by weight water.

7. A process according to claim 3, wherein the monomer or mixture of monomers is present in the aqueous medium in an amount of 5 to 50% by weight.

8. A process according to claim 3, wherein said alkali metal salt is an alkali metal salt of a mixture of linear polysulfonate alkanes.

9. An aqueous dispersion of a synthetic polymer having particles of an average diameter in the range of about 50 to about 500 nm, said aqueous dispersion having a solids content of 5 to 50 parts by weight per 100 parts by weight of total dispersion, said aqueous dispersion containing an emulsifier which comprises 15 to 100 parts by weight of an alkali metal salt of a polysulfonic acid of an alkane of medium chain length per 100 parts by weight of total emulsifier.

10. An aqueous dispersion according to claim 9, wherein said emulsifier is present in said aqueous dispersion in an amount of 0.05 to 10 parts by weight per 100 parts by weight of water.

11. An aqueous dispersion according to claim 9, wherein said particles have an average diameter of above 95 nm.

12. An aqueous dispersion according to claim 11, wherein said particles have an average diameter of about 150 to about 500 nm.

13. An aqueous dispersion according to claim 9, wherein said synthetic polymer is a thermoplastic.

14. An aqueous dispersion according to claim 9 wherein said synthetic polymer is a polyvinyl chloride polymer.

* * * * *

UNITED STATES PATENT AND TRADEMARK OFFICE
CERTIFICATE OF CORRECTION

PATENT NO. : 4,327,004
DATED : April 27, 1982
INVENTOR(S) : Adolf Schmidt et al

It is certified that error appears in the above-identified patent and that said Letters Patent are hereby corrected as shown below:

Col. 14 (Second Chart)
   (a) under Solids Content %

Delete "36.8" and insert --26.8--

Col. 22, line 66

After "according to claim" delete "3" and insert --2--

Signed and Sealed this

Sixteenth Day of November 1982

[SEAL]

*Attest:*

*Attesting Officer*

GERALD J. MOSSINGHOFF

*Commissioner of Patents and Trademarks*